(12) United States Patent
Harrick et al.

(10) Patent No.: US 7,184,366 B1
(45) Date of Patent: Feb. 27, 2007

(54) SHORT SEISMIC STREAMER STRETCH SECTION WITH ADJUSTABLE SPRING FORCE

(75) Inventors: Bruce William Harrick, Sugar Land, TX (US); Michael Gunter Gronemeyer, Chonburi (TH)

(73) Assignee: PGS Geophysical AS, Lysaker (NO)

( * ) Notice: Subject to any disclaimer, the term of this patent is extended or adjusted under 35 U.S.C. 154(b) by 0 days.

(21) Appl. No.: 11/316,259

(22) Filed: Dec. 21, 2005

(51) Int. Cl.
*G01V 1/38* (2006.01)
(52) U.S. Cl. .................................................. 367/20
(58) Field of Classification Search ................ 267/69, 267/73; 367/20
See application file for complete search history.

(56) References Cited

U.S. PATENT DOCUMENTS 5,259,597 A * 11/1993 Fredheim .................... 267/69

\* cited by examiner

*Primary Examiner*—Mark Hellner
(74) *Attorney, Agent, or Firm*—E. Eugene Thigpen; Richard A. Fagin (57) ABSTRACT

A seismic streamer stretch section includes at least one spring member. The section includes means for coupling the at least one spring member at each end to at least one of a seismic streamer and a seismic lead in cable, and a cable coupled at its ends to the means for coupling. The cable is capable of carrying electrical and/or optical signals. The cable is formed such that it undergoes substantially no axial strain when the spring member is elongated.

34 Claims, 5 Drawing Sheets

SHORT SEISMIC STREAMER STRETCH SECTION WITH ADJUSTABLE SPRING FORCE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic survey apparatus. More particularly, the invention relates to "stretch sections" used in marine seismic streamer systems to reduce noise.

2. Background Art

Marine seismic survey apparatus known in the art include arrays of seismic sensors disposed in a structure adapted to be towed by a seismic vessel through a body of water, such as a lake or the ocean. Such seismic receiver structures are known as "streamers."

Streamers are typically made in segments of about 75 meters length. A streamer may include 100 or more such segments coupled end to end to form the complete streamer. Each streamer segment generally include one or more steel or high strength fiber rope strength members that extend the length of the streamer segment. A commonly used fiber is one sold under the trademark KEVLAR, which is a registered trademark of E.I. du Pont de Nemours & Co., Wilmington, Del. The one or more strength members typically include buoyancy devices at spaced apart locations along the length of the strength members. The buoyancy devices may be made from foamed polyurethane or the like and help provide the streamer with an overall density similar to that of the water in which the streamer is to be towed. Electrical and/or optical sensors are disposed along the length of the strength member at spaced apart locations, typically in some of the buoyancy devices. Electrical and/or optical cables extend along the length of the streamer and are coupled to the sensors so as to transmit signals generated by the sensors in response to seismic energy to a recording device, which may be on the seismic vessel or at another location. Other conductors may be used to transmit electrical power. The streamer segment is typically covered with an acoustically transparent, flexible jacket, made from a material such as polyurethane and the like. The interior of the jacket is typically filled with an acoustically transparent, electrically non-conductive material such as oil, or curable polyurethane gel. The streamer segment typically includes a combination mechanical and electrical/optical coupling at each of its axial ends so that the streamer segment can be coupled to another such streamer segment or, through a stretch section, to a "lead in" cable, explained further below, coupled to the seismic vessel. The coupling transfers axial force from segment to segment and ultimately to the seismic vessel through the lead in cable.

In a typical seismic survey acquisition system, one or more streamers made as described above are towed behind the seismic vessel in the water. In acquisition systems having more than one streamer, the streamers are typically laterally separated from each other by coupling their forward ends at spaced apart positions to a "spreader cable" that extends transversely to the direction of motion of the seismic vessel. A device called a "diverter" is positioned at each end of the spreader cable. The diverters include vanes that cooperate with the movement of water during towing to exert a laterally outward force with respect to the direction of movement of the seismic vessel, and thus, maintain the spreader cable in tension.

The "lead in" cable includes a plurality of electrical and/or optical conductors that are essentially completely surrounded by one or more layers of helically wound steel wires. The steel wires are referred to as "armor" and protect the conductors from damage, and transmit axial load from the each of the streamers to the seismic vessel.

A particular issue that concerns marine seismic survey acquisition systems known in the art is a type of noise created by movement of the water past the lead in cable and the spreader cable. The noise is known as "strumming" and such noise can be of a nature so as to materially adversely affect the quality of the seismic signals detected by the sensors in the streamers. Other types of noise that affect streamers include mechanically generated noise in the diverters and fluctuation in the towing speed caused by variations in water conditions. One device known in the art for reducing transmission of such noise between the lead in cable and the streamer is known as a "stretch section." A stretch section is typically formed similarly to a streamer segment as described above, with the principal differences being that the strength member in the stretch section is typically formed from a more elastic material than that used for streamer segments, and that there are no seismic sensors in the stretch section. An example of a material used for stretch section strength members is nylon rope. Typically, the stretch section is coupled between the lead in cable and the forward axial end of the streamer. Another type of device for reducing such noise transmission is called a vibration isolation module. A vibration isolation module is typically configured as a solid, elastomer cylinder of a selected length coupled between the forward end of the streamer and the lead-in cable. Vibration isolation modules known in the art are subject to tearing of the elastomer, and subsequent failure of the module.

Typical stretch sections are on the order of 50 meters in length. One or more such stretch sections may be coupled between the lead in cable and the forward end of the streamer. When more than one stretch section is used, the sections are coupled end to end to produce a longer stretch section. The total length of stretch section used in any particular seismic survey system will depend on the length of the streamer coupled to the stretch section. While they are effective in reducing strumming noise in the sensor signals, stretch sections do cause the nearmost seismic sensor to be spaced a considerable distance from the seismic vessel because of their length. Such distance increases the minimum offset, such being the distance between a seismic sensor and a seismic energy source towed in the water. Also, the construction of the typical stretch section results in such stretch sections requiring similar type and frequency of maintenance as a streamer segment. Such maintenance can be difficult and expensive. It is desirable to have a stretch section which can minimize the additional length to the streamer, avoids the failure modes of vibration isolation modules, and can be easily repaired in the field.

SUMMARY OF THE INVENTION

One aspect of the invention is a seismic streamer stretch section. A streamer stretch section according to this aspect of the invention includes at least one spring member. The section includes means for coupling the at least one spring member at each end to at least one of a seismic streamer and a seismic lead in cable, and a cable coupled at its ends to the means for coupling. The section includes means for damping the at least one spring member. The cable is capable of carrying electrical and/or optical signals. The cable is formed such that it undergoes substantially no axial strain when the spring member is elongated.

In one embodiment, the spring member is a fiber reinforced elastomer shock cord. In one embodiment, the spring member has a spring constant of at most about 5000 N/m. In one embodiment, the fiber-reinforced, elastomer shock cord is self damping.

Another aspect of the invention is a seismic streamer. A streamer according to this aspect of the invention includes a lead in cable adapted to be coupled at one end to a seismic vessel, and at the other end to a seismic streamer sensor cable. The seismic receiver cable comprises a cable having seismic sensors at spaced apart locations therealong. The streamer includes a stretch section coupled between the lead in cable and the sensor cable. The stretch section includes at least one spring member. The stretch section includes means for coupling the at least one spring member at one end to the lead in cable and at the other end to the sensor cable. The stretch section includes a conductor cable coupled at its ends to the means for coupling. The conductor cable is capable of carrying at least one of electrical and optical signals, and the conductor cable is formed such that the conductor cable undergoes substantially no axial strain when the spring member is elongated.

In one embodiment, the spring member is a fiber reinforced elastomer shock cord. In one embodiment, the spring member has a spring constant of at most about 3000 kg/m.

Other aspects and advantages of the invention will be apparent from the following description and the appended claims.

DETAILED DESCRIPTION

Figure 1:
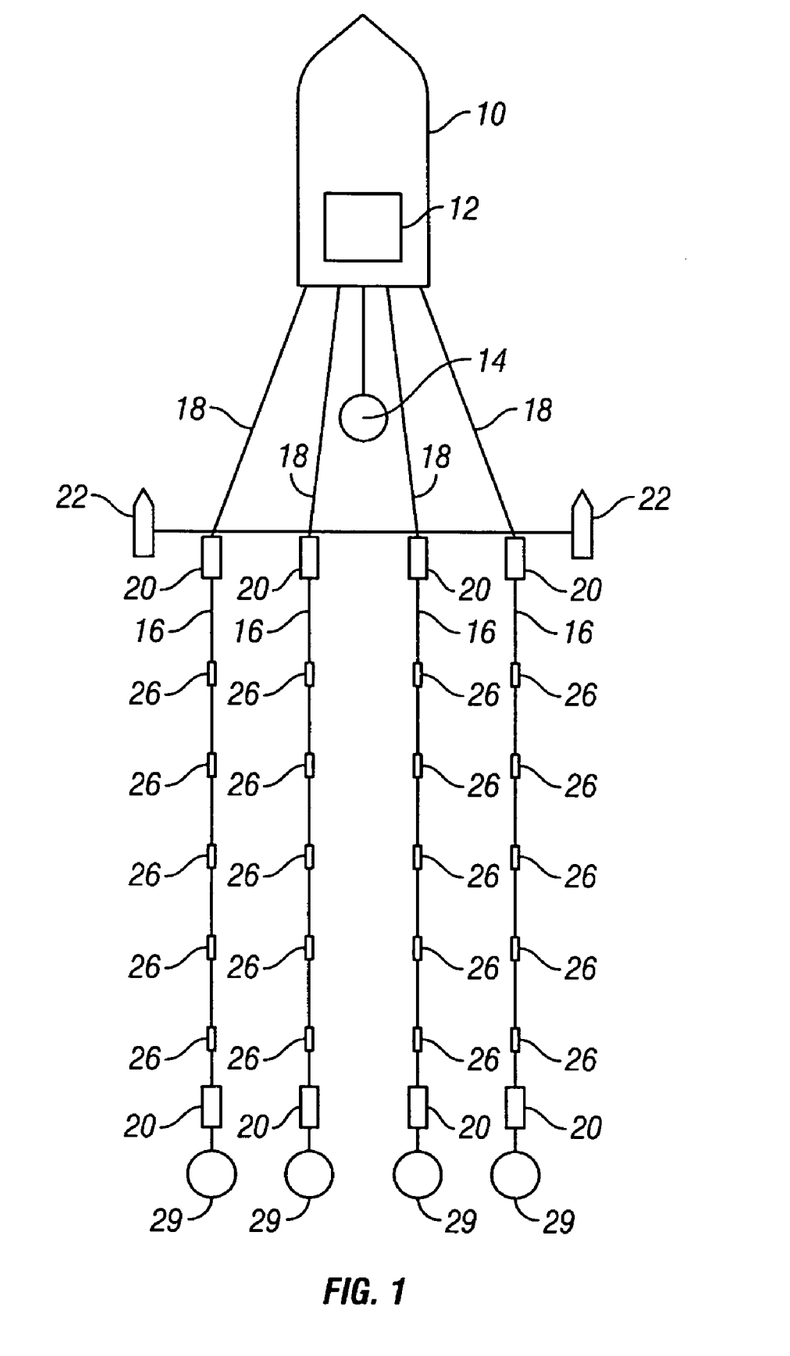
FIG. 1 shows a marine seismic acquisition system in which a stretch section according to the invention can be used.

A marine seismic acquisition system including a stretch section according to the invention is shown in FIG. 1. The seismic data acquisition system includes a seismic vessel 10 which tows at least one and typically a plurality of laterally spaced apart seismic streamers 16 through a body of water 11 such as a lake or the ocean. The seismic vessel 10 typically includes instrumentation thereon collectively called a "recording system" and shown generally at 12. The recording system 12 may include navigation devices, electrical power supplies, data recording equipment and seismic source actuation equipment of types well known in the art. The data recording equipment (not shown separately for clarity of the illustration) makes recordings, typically indexed with respect to time of actuation of a seismic energy source 14, of signals detected by seismic sensors 26 disposed at spaced apart locations along the streamers 16.

The streamers 16, as explained in the Background section herein, are typically made from a plurality of segments (not shown separately) each of which is about 75 meters length. A typical streamer includes many such segments coupled end to end to form the complete streamer 16. Each streamer segment (not shown separately) generally includes one or more steel or high strength fiber rope strength members (not shown separately) that extend the length of the streamer segment. The one or more strength members typically include buoyancy devices (not shown separately) at spaced apart locations along the length of the strength members. The buoyancy devices may be made from foamed polyurethane or the like and are provided to help provide the streamer with an overall density similar to that of the water in which the streamer is towed. Electrical and/or optical sensors 26 are disposed along the length of the strength member at spaced apart locations, sometimes in one or more of the buoyancy devices. Electrical and/or optical conductors (not shown separately) in a cable (not shown separately) extend along the length of the streamer 16 and are coupled to the sensors 26 so as to transmit signals to the recording system 12 that are generated by the sensors 26 in response to seismic energy. The streamer segments are typically covered with an acoustically transparent, flexible jacket (not shown separately), such as made from polyurethane or the like. The interior of the jacket is typically filled with an acoustically transparent, electrically non-conductive material such as oil, or curable urethane gel. The streamer segments typically include a combination mechanical and electrical/optical coupling (not shown separately) at each of their axial ends so that the streamer segments can each be coupled to another such streamer segment or to a "lead in" cable 18.

There is typically one lead in cable 18 for each of the streamers 16 to couple each of the streamer 16 mechanically, and electrically and/or optically to the seismic vessel 10. Mechanical coupling enables the vessel 10 to pull the streamers 16 through the water 11. Electrical and/or optical coupling enables signals from the sensors 26 to be carried to the recording system 12. Also as explained in the Background section herein, the lead in cable 18 typically includes electrical and/or optical conductors (not shown separately) surrounded by helically wound steel armor wires. The conductors carry the signals and/or carry electrical power. The armor wires transmit axial force from the vessel 10 for towing, and protect the conductors from damage.

In the embodiment of seismic acquisition system shown in FIG. 1, the streamers 16 are towed at laterally spaced apart positions with respect to each other. Lateral separation is maintained between the streamers 16 by coupling the lead in end of each streamer 16 to a spreader cable 24. The spreader cable 24 extends generally transversely to the direction of motion of the seismic vessel 10, and includes at each of its ends a diverter 22. The diverters 22 act cooperatively with motion of the water 11 as the seismic acquisition system is towed through the water such that tension is maintained on the spreader cable 24.

The embodiment of the seismic acquisition system shown in FIG. 1 can include a seismic energy source 14, of any type known in the art for marine seismic data acquisition. FIG. 1 shows the source 14 being towed by the seismic vessel 10. Other embodiments may include a plurality of such seismic energy sources, or may have one or more seismic energy sources towed by a different vessel.

In the embodiment of FIG. 1, each streamer 16 includes a tail buoy 29 at the end thereof most distant from the seismic vessel 10. The tail buoys 29 may include navigation and/or signal telemetry devices known in the art, such as a global positioning system (GPS) receiver and wireless data telemetry transceiver.

All of the foregoing components of a marine seismic data acquisition system may be of types well known in the art. Particular specifications for any of the foregoing components of a marine seismic data acquisition system are a matter of discretion for the designer and user of such systems, and are therefore not limitations on the scope of the invention.

In the embodiment of FIG. 1, each streamer 16 is coupled to its respective lead in cable 18 using a stretch section 20 according to the invention. The streamers 16 may also be coupled to their respective tail buoys 29 using a similar stretch section 20. The stretch sections 20 provide an elastic coupling between the respective streamers 16 and lead in cables 18, and if used, between respective tail buoys 29 such that strumming noise caused by motion of the various components in the water 11 is attenuated.

Figure 2:
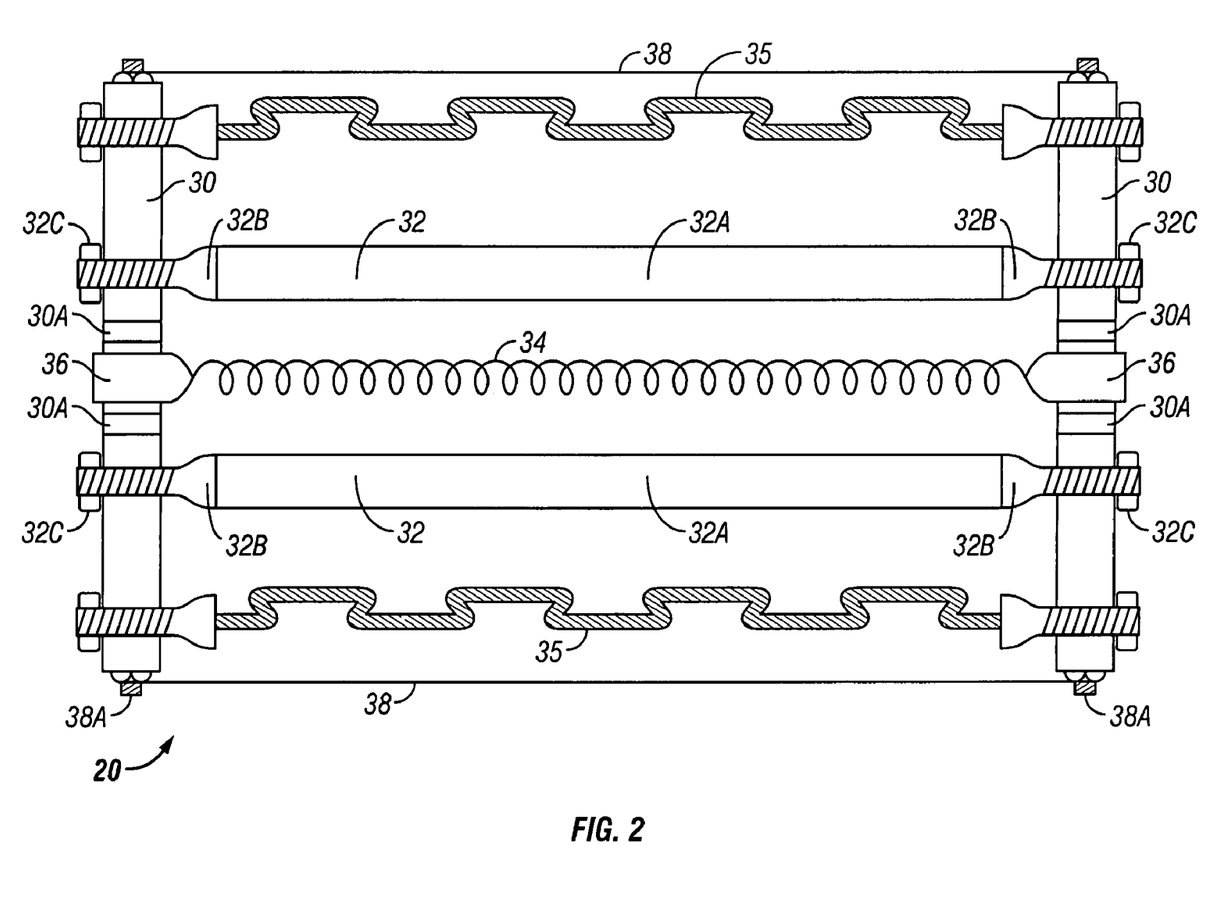
FIG. 2 shows a cross sectional view of one embodiment of a stretch section according to the invention.

One embodiment of a stretch section according to the invention is shown in cross-section in FIG. 2. The stretch section 20 includes at each longitudinal end a termination plate 30 that may be formed from steel, aluminum, fiber reinforced plastic or other high-strength material. The termination plates 30 are each joined to one end of one or more spring members 32. In the present embodiment the spring members 32 can be shock cords, the composition and configuration of which will be further explained. The shock cords 32 extend most of the length of the stretch section 20 and are correspondingly coupled at each end thereof to one of the termination plates 30. In the present embodiment, the shock cords 32 may be made from a fiber-reinforced, elastomer cord material such as sold under product designation "power spring" by Ibex Ropes, Ltd., Manchester Road, Mossley, Ashton-Under-Lyne OL5 9AJ, United Kingdom. Such shock cord material includes a rubber or other elastomeric tension element, which element is covered on its exterior by, and may be underlain inside its interior by, a woven fiber layer. The weave of the fiber layer(s) is such that it enables extension of the shock cord 32 as tension is applied to the cord 32. In the present embodiment, a nominal diameter of the shock cords 32 can be about 32 millimeters, and the unstretched length of the shock cords 32 can be about 3 to 5 meters.

FIG. 2 shows that the termination plates 30 each include additional openings 30A through which additional shock cords may be affixed to each termination plate 30. In the present embodiment, if it is desirable to change the spring constant (the amount of longitudinal extension of the stretch section with respect to the amount of applied tension usually expressed in kilograms per meter) of the stretch section 30, the user may couple one or more additional shock cords to the termination plates 30 to increase the spring constant, or may remove one or more shock cords 32 to decrease the spring constant. Thus, the present embodiment may provide the capability to select a spring constant for the stretch section 20 that is appropriately matched to the amount of drag expected for the particular streamer (16 in FIG. 1). The amount of such drag will depend on, among other factors, the length and diameter of the streamer and the speed at which the streamer is towed through the water (11 in FIG. 1). In one embodiment, the termination plates 30 are configured with openings 30A to enable coupling up to ten such shock cords therebetween.

In the present embodiment, the shock cords 32 may be coupled to the termination plates 30 by particularly formed end caps 32B. Each end cap 32B may be made from steel or other high strength material and can include at one an opening for receiving one end of the shock cord material 32A, and at the other end can include a threaded rod of suitable diameter and length to pass through one of the openings 30A in one of the termination plates 30. The threaded rod end of the cap 32B may be retained in the opening 30A by a hex nut 32C or similar threaded fastener. In the present embodiment, the end caps 32B may be affixed to the shock cord material 32A by crimping the open end of the cap 32B over the cord material 32A and by including a bonding adhesive (not shown) such as epoxy in the interior thereof prior to crimping.

The stretch section 20 includes an electrical and/or optical cable 34 of types known in the art for conducting data signals and/or electrical power. In the present embodiment, the cable 34 is preferably wound in coil form as shown in FIG. 2, such that even at the full longitudinal extension of the stretch section 30, the cable 34 will substantially not undergo any longitudinal strain in the internal components of the cable 34. The cable 34 may be coupled at each end to the termination plates 30 using an electrical and/or optical connector 36 of any type known in the art for joining seismic streamer segments to each other or to a lead in cable (18 in FIG. 1).

The stretch section 20 preferably includes a "catcher rope" 35, coupled at each end to one of the termination plates 30. The catcher rope 35 may be coiled, folded or otherwise include slack such that its extended length is less than the length of the stretch section 20 when the maximum expected axial load is applied thereto. The purpose of the catcher rope 35 is to prevent loss of the streamer in the event the shock cords 32 fail due. The catcher rope may be made from fiber rope similar in composition to that used for the strength member(s) in the streamer(s).

The stretch section 20 may be covered by a waterproof, longitudinally elongatable jacket 38. The jacket 38 may be secured to the termination plates 30 by clamps 38A or the like, so as to substantially exclude water from the interior of the jacket 38. Preferably the jacket 38 is made from a material suitable for, and is of a configuration suitable to enable the jacket 38 to elongate to the expected length of the stretch section 30 under full axial load without damaging the jacket 38.

Figure 3:
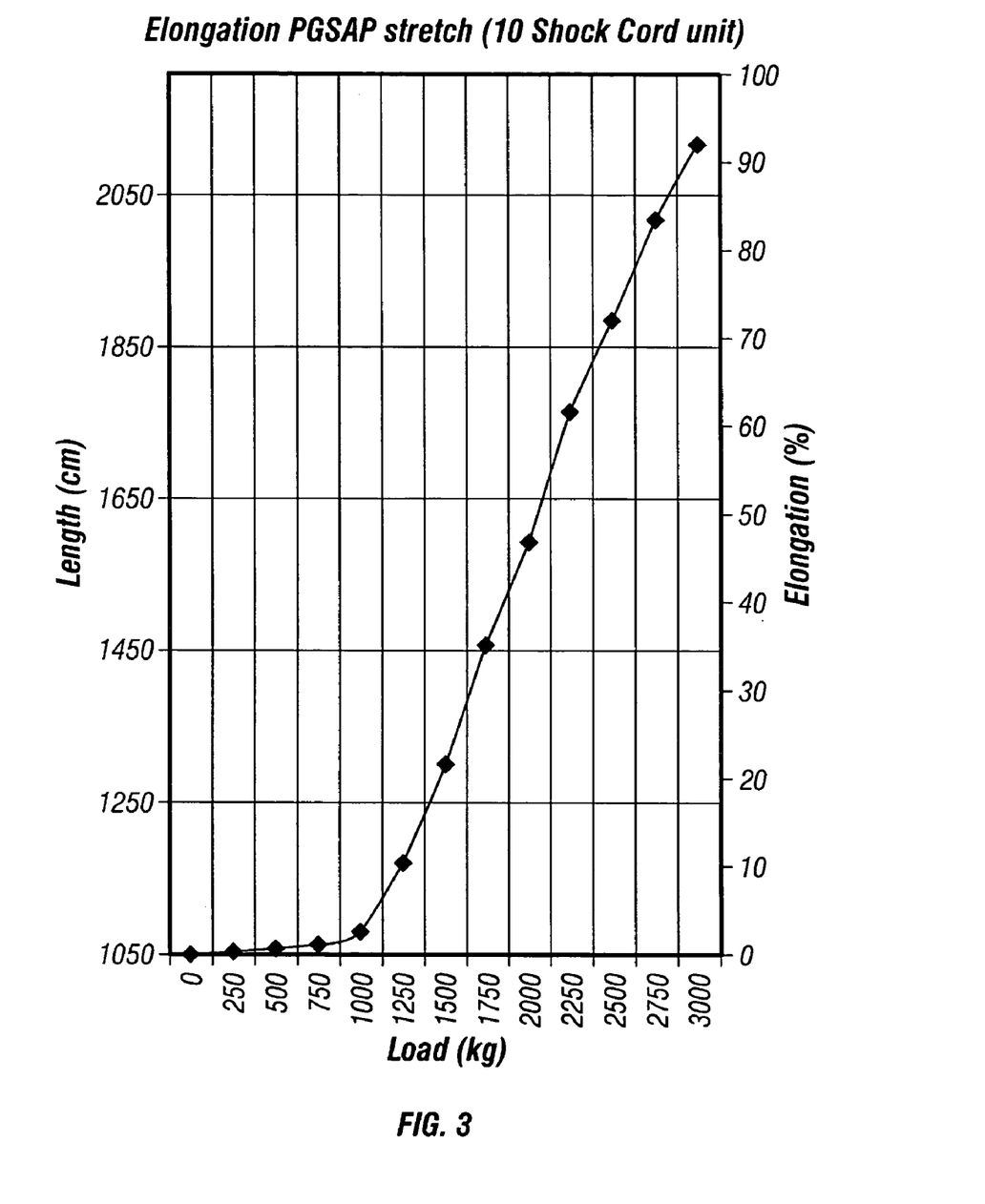
FIG. 3 shows a graph of expected elongation of one embodiment of a stretch section according to the invention with respect to applied tension.

FIG. 3 shows a graph of expected axial elongation of a stretch section according to the invention with respect to applied tension, where ten shock cords (32 in FIG. 2) made as explained above are used in the stretch section. It is to be noted that the expected minimum operating tension load using ten shock cords is about 1000 kilograms force. When the seismic data acquisition system uses short streamers, of length less than about 3000 meters, the stretch section preferably is installed with a reduced number of shock cords. It is believed that the following numbers of shock cords in a stretch section with respect to streamer length according to the invention will provide suitable function:

| | |
|---|---|
| streamer length less than 1500 meters | 6 shock cords; |
| streamer length 1500 to 3000 meters | 8 shock cords; and |
| streamers longer than 3000 meters | 10 shock cords |

Referring back to FIG. 2, in principle the one or more shock cords 32 perform the function of a spring. In other embodiments, the shock cords 32 may be substituted by various forms of spring member, for example, a coil spring or any other spring device which stretches longitudinally under tension. In such other embodiments, a practical implementation may include having individual spring members each with a spring constant of at most about 500 Newtons per meter (N/m). Using individual spring members with such a spring constant will provide the stretch section with longitudinal extension and noise damping characteristics similar to the embodiment shown in FIG. 2 using one or more shock cords as the spring member. Still other embodiments may use fewer such springs, each with a higher spring constant. In such other embodiments, a total spring constant for all the spring members combined may be at most about 3000 N/m for streamers less than about 1500 meters length, at most about 4000 N/m for streamers between 1500 and 3000 meters length, and at most about 5000 N/m for streamers of 3000 meters length or more. Preferably, such embodiments include means for damping the spring member. Damping characteristics of the means for damping are preferably similar to the self-damping characteristics of the shock cord used in other embodiments, and substantially as will be further explained below. It will be appreciated that in embodiments of a stretch section making use of one or more shock cords as described herein, the means for damping is the self-damping of the shock cord itself.

A particular advantage to using shock cords as described above in some embodiments is that they have been shown by testing to provide substantial reduction in strumming and other mechanically induced noise transmitted through to the streamer from the lead in cable. The mechanical properties of the above described shock cords have been tested and such testing has shown that the shock cords appear to have substantial internal friction, and have self-damping that is both non-linear and decreases with respect to elongation (or axial loading) of the shock cord material. Testing of the shock cord material suggests that at zero axial elongation, the damping coefficient of the shock cord material is about 0.6. When elongated by about 100 percent, testing suggest that the shock cord material has a damping coefficient of about 0.05.

Figure 4:
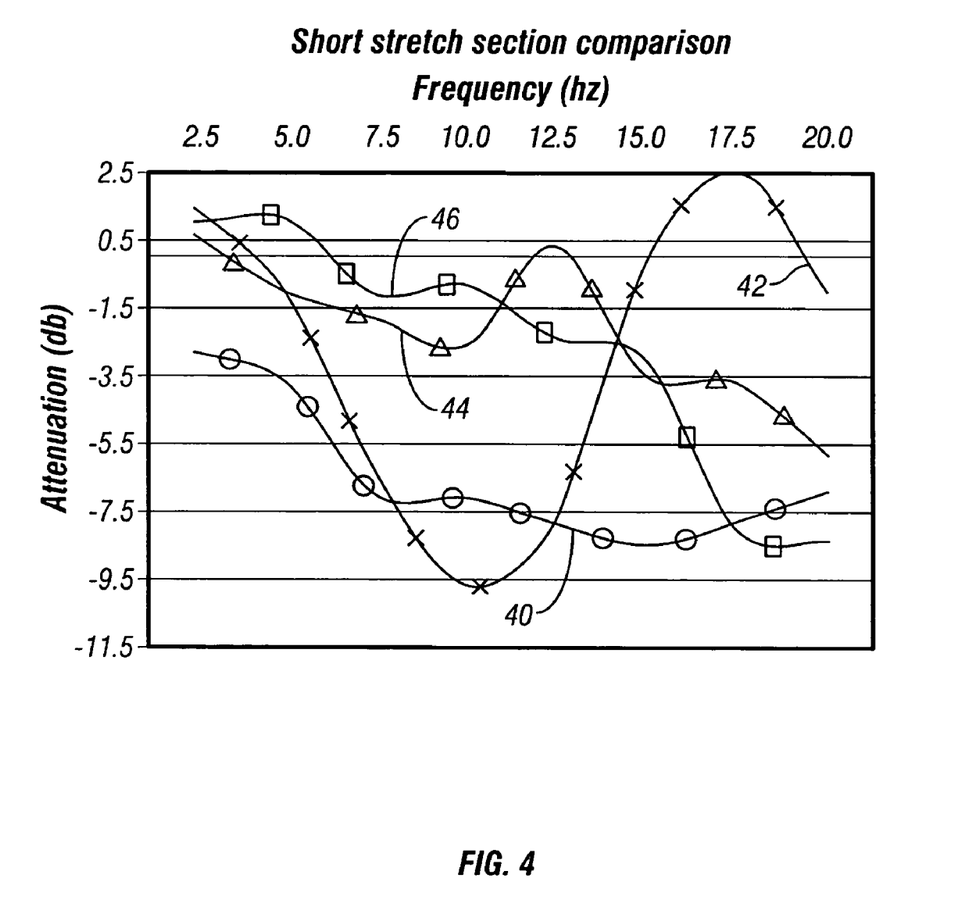
FIG. 4 shows a graph of acoustic attenuation at various frequencies for several types of prior art stretch sections and for a stretch section according to one embodiment of the invention.

A comparison of the acoustic attenuation for various types of stretch sections, including one embodiment of a stretch section according to the invention is shown in a graph in FIG. 4. The graph in FIG. 4 shows, for various excitation frequencies, an amount of acoustic attenuation (in dB) for a 10 meter length prior art stretch section, at curve 42, where such prior art stretch section is made substantially as explained in the Background section herein. Similar attenuation with respect to excitation frequency is shown for two substantially solid rubber cylinder vibration isolation module designs as shown at curves 44 and 46. Attenuation characteristics of an embodiment of a stretch section according to the invention is shown at curve 40. As can be inferred from FIG. 4, a stretch section made according to the invention can have a greater overall acoustic attenuation, because of the greater attenuation bandwidth, than other types of stretch section.

Figure 5:
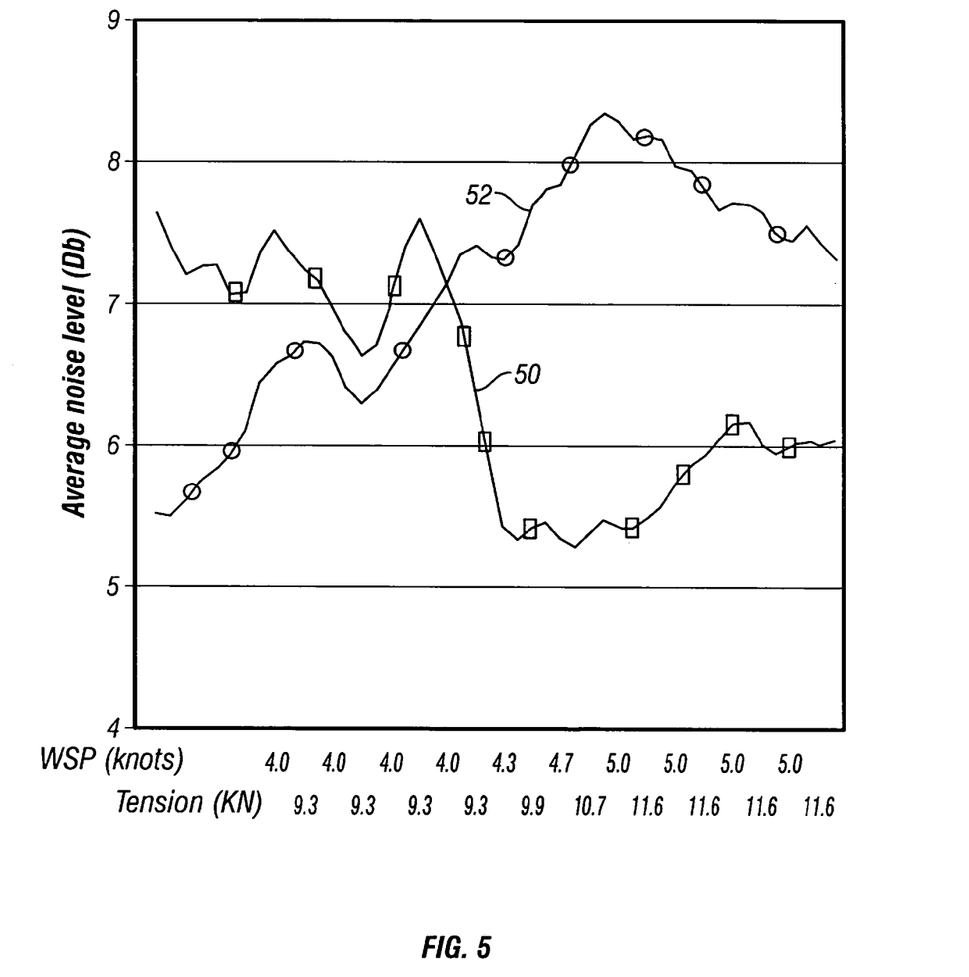
FIG. 5 shows a comparison of average noise level in a moving streamer using a prior art stretch section and a stretch section according to the invention.

Referring to FIG. 5, the performance of a stretch section according to the invention with respect to noise in a towed streamer is compared to such performance of a prior art, 50 meter long stretch section. In the graph of FIG. 5, the horizontal axis is scaled in towing speed in knots and tension on the streamer in kilonewtons. The vertical axis is scaled in average noise level in the streamer in decibels. Noise in the streamer when using a prior art stretch section is shown by curve 52. Noise in the streamer using a stretch section according to the invention is shown at curve 50. Reduction in average noise at higher towing speed, above about 4.0 knots when using a stretch section according to the invention is substantial when compared with prior art stretch sections.

It will be readily appreciated by those skilled in the art that stretch sections known in the art also have characteristics like a spring member, however, the spring constant of such stretch sections known in the art can be 100,000 kg/m or more, requiring lengths of such stretch section as much as 150 meters or more to provide the required degree of attenuation of strumming noise. Accordingly, stretch sections made according to the invention may be substantially shorter (5 meters or less) than prior art stretch sections while still providing substantial attenuation of strumming noise. Additionally, stretch sections made according to the invention may have easily adjustable spring constants for use with different streamer lengths and/or configurations, and may have reduced maintenance time and expense because they are not built in a manner similar to the streamer segments and are much shorter than prior art stretch sections.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A seismic streamer stretch section, comprising:
   at least one shock cord;
   means for coupling the at least one shock cord at each end to at least one of a seismic streamer and a seismic lead in cable; and
   a cable coupled at its ends to the means for coupling, the cable capable of carrying at least one of electrical and optical signals, the cable formed such that the cable undergoes substantially no axial strain when the shock cord is elongated.

2. The section of claim 1 wherein the means for coupling comprises a termination plate having openings for receiving an end of the at least one shock cord therein, the termination plate comprising a connector for making mechanical connection to the at least one of the streamer and the lead in cable, the connector for making at least one of electrical and optical contact to the at least one of the streamer and the lead in cable.

3. The section of claim 1 further comprising a jacket arranged about an exterior of the at least one shock cord and the means for coupling to exclude water from an interior of the jacket.

4. The section of claim 1 wherein the at least one shock cord comprises a fiber reinforced elastomer cord.

5. The section of claim 2 wherein the at least one shock cord comprises a cap on each end thereof, each cap having in internal opening for receiving an end of the shock cord, the cap having a threaded rod for insertion into a corresponding opening in the termination plate.

6. The section of claim 1 further comprising a plurality of shock cords, and wherein the means for coupling is adapted to couple the plurality of shock cords to the at least one of the streamer and the lead in cable, a number of the plurality of shock cords selected to correspond to a length of the streamer.

7. The section of claim 1 wherein the at least one shock cord is self-damping.

8. The section of claim 7 wherein a damping coefficient is about 0.6 when the at least one shock cord is unelongated, the damping coefficient being about 0.05 when the at least one shock cord is elongated by about 100 percent.

9. A seismic streamer, comprising:
 a lead in cable adapted to be coupled at one end to a seismic vessel, and at the other end to a seismic streamer sensor cable, the seismic receiver cable comprising a cable having seismic sensors at spaced apart locations therealong; and
 a stretch section coupled between the lead in cable and the sensor cable, the stretch section including at least one shock cord, the section including means for coupling the at least one shock cord at one end to the lead in cable and at the other end to the sensor cable, the section including a conductor cable coupled at its ends to the means for coupling, the conductor cable capable of carrying at least one of electrical and optical signals, the conductor cable formed such that conductor cable undegoes substantially no axial strain when the shock cord is elongated.

10. The streamer of claim 9 wherein the means for coupling comprises a termination plate having openings for receiving an end of the at least one shock cord therein, the termination plate comprising a connector for making mechanical connection to the at least one of the sensor cable and the lead in cable, the connector for making at least one of electrical and optical contact to the at least one of the sensor cable and the lead in cable.

11. The streamer of claim 9 further comprising a jacket arranged about an exterior of the at least one shock cord and the means for coupling to exclude water from an interior of the jacket.

12. The streamer of claim 9 wherein the at least one shock cord comprises a fiber reinforced elastomer cord.

13. The streamer of claim 10 wherein the at least one shock cord comprises a cap on each end thereof, each cap having in internal opening for receiving an end of the shock cord, the cap having a threaded rod for insertion into a corresponding opening in the termination plate.

14. The streamer of claim 9 further comprising a plurality of shock cords, and wherein the means for coupling is adapted to couple the plurality of shock cords to the at least one of the streamer and the lead in cable, a number of the plurality of shock cords selected to correspond to a length of the sensor cable.

15. The streamer of claim 9 further comprising a tail buoy, the tail buoy coupled to an end of the sensor cable by a stretch section, the stretch section including at least one shock cord, the section including means for coupling the at least one shock cord at one end to the tail buoy and at the other end to the sensor cable, the section including a conductor cable coupled at its ends to the means for coupling, the conductor cable having at least one of an electrical conductor and an optical conductor therein, the conductor cable formed such that the at least one of the electrical conductor and the optical conductor undergoes substantially no axial strain when the shock cord is elongated.

16. The streamer of claim 9 wherein the at least one shock cord is self-damping.

17. The streamer of claim 16 wherein a damping coefficient is about 0.6 when the at least one shock cord is unelongated, the damping coefficient being about 0.05 when the at least one shock cord is elongated by about 100 percent.

18. A seismic streamer stretch section, comprising:
 at least one spring member, the spring member having a spring constant of at most about 5000 Newtons per meter;
 means for damping the at least one spring member;
 means for coupling the at least one spring member at each end to at least one of a seismic streamer and a seismic lead in cable; and
 a cable coupled at its ends to the means for coupling, the cable capable of carrying at least one of electrical and optical signals, the cable formed such that the cable undergoes substantially no axial strain when the spring member is elongated.

19. The section of claim 18 wherein the means for coupling comprises a termination plate having openings for receiving an end of the at least one spring member therein, the termination plate comprising a connector for making mechanical connection to the at least one of the streamer and the lead in cable, the connector for making at least one of electrical and optical contact to the at least one of the streamer and the lead in cable.

20. The section of claim 18 further comprising a jacket arranged about an exterior of the at least one shock cord and the means for coupling to exclude water from an interior of the jacket.

21. The section of claim 18 wherein the at least one spring member comprises a fiber reinforced elastomer shock cord.

22. The section of claim 21 wherein the shock cord comprises a cap on each end thereof, each cap having in internal opening for receiving an end of the shock cord, the cap having a threaded rod for insertion into a corresponding opening in the termination plate.

23. The section of claim 22 wherein the means for damping comprises self-damping of the shock cord.

24. The section of claim 23 wherein a damping coefficient is about 0.6 when the at least one shock cord is unelongated, the damping coefficient being about 0.05 when the at least one shock cord is elongated by about 100 percent.

25. The section of claim 18 further comprising a plurality of spring members, and wherein the means for coupling is adapted to couple the plurality of spring members to the at least one of the streamer and the lead in cable, a number of the plurality of spring members selected total spring constant, the selected total spring constant related to a length of the streamer.

26. A seismic streamer, comprising:
 a lead in cable adapted to be coupled at one end to a seismic vessel, and at the other end to a seismic streamer sensor cable, the seismic receiver cable comprising a cable having seismic sensors at spaced apart locations therealong; and
 a stretch section coupled between the lead in cable and the sensor cable, the stretch section including at least one spring member having a spring constant of at most about 5000 Newtons per meter, the section including means for damping the at least one spring member, the section including means for coupling the at least one spring member at one end to the lead in cable and at the other end to the sensor cable, the section including a conductor cable coupled at its ends to the means for coupling, the conductor cable capable of carrying at least one of electrical and optical signals, the conductor cable formed such that the conductor cable undergoes substantially no axial strain when the spring member is elongated.

27. The streamer of claim 26 wherein the means for coupling comprises a termination plate having openings for receiving an end of the at least one spring member, the termination plate comprising a connector for making mechanical connection to the at least one of the sensor cable and the lead in cable, the connector for making at least one of electrical and optical contact to the at least one of the sensor cable and the lead in cable.

28. The streamer of claim 26 further comprising a jacket arranged about an exterior of the at least one spring member and the means for coupling to exclude water from an interior of the jacket.

29. The streamer of claim 28 wherein the at least one spring member comprises a fiber reinforced elastomer shock cord.

30. The streamer of claim 28 wherein the means for damping comprises self-damping of the shock cord.

31. The streamer of claim 29 wherein a damping coefficient is about 0.6 when the at least one shock cord is unelongated, the damping coefficient being about 0.05 when the at least one shock cord is elongated by about 100 percent.

32. The streamer of claim 27 wherein the at least one spring member comprises a cap on each end thereof, each cap having in internal opening for receiving an end of the shock cord, the cap having a threaded rod for insertion into a corresponding opening in the termination plate.

33. The streamer of claim 26 further comprising a plurality of spring members, and wherein the means for coupling is adapted to couple the plurality of spring members to the at least one of the streamer and the lead in cable, a number of the plurality of spring members selected to have a total spring constant corresponding to a length of the sensor cable.

34. The streamer of claim 26 further comprising a tail buoy, the tail buoy coupled to an end of the sensor cable by a stretch section, the stretch section including at least one spring member having a spring constant of at most about 5000 Newtons per meter, the section including means for coupling the at least one spring member at one end to the tail buoy and at the other end to the sensor cable, the section including a conductor cable coupled at its ends to the means for coupling, the conductor cable having at least one of an electrical conductor and an optical conductor therein, the conductor cable formed such that the at least one of the electrical conductor and the optical conductor undergoes substantially no axial strain when the spring member is elongated.

* * * * *